UNITED STATES PATENT OFFICE.

JEAN ROSEN, OF PARIS, FRANCE.

PROCESS OF MANUFACTURE OF AN AGGLUTINANT FOR COATINGS.

1,273,927.  Specification of Letters Patent.  Patented July 30, 19.. ..

No Drawing. Application filed July 30, 1914, Serial No. 854,161. Renewed May 29, 1918. Serial No. 237,367.

*To all whom it may concern:*

Be it known that I, JEAN ROSEN, a citizen of France, residing at Paris, France, 25 Rue Pigalle, have invented certain new and useful Improvements in Processes of Manufacture of an Agglutinant for Coatings, of which the following is a specification.

This invention relates to a process for manufacturing an agglutinant, such as is particularly adapted for use in coating iron work, said coating or agglutinant consisting essentially of acid oils, heavy oils or what may be termed polymerized products of coal tar, petroleum tar (petroleum residues) and the like. The products of this process being particularly characterized by the fact that the carbon or too hightly polymerized constituent that may have become insoluble in the products when raised to a temperature of approximately 80° C. is reduced to an extremely low percentage.

To this end the process as carried on with coal tars as the raw material will first be considered; in the first stage of the process, using coal tars, the latter are heated to drive off ammonia and other volatile products such as light hydro-carbon oils, these constituents of the raw material being removed by the usual method of distillation. After the ammonia and other volatile products have been thus eliminated the residue is subjected to a further distillation at a temperature ranging between 120° to 240° C., and which in any event must not exceed 250° C. In the accomplishment of this second distillation the residue is reduced to a layer of moderate thickness and, during distillation, is constantly agitated by the passage of a current of gas therethrough under a reduced pressure, some gas such as air diluted with an inert gas such as nitrogen being used which at the temperature and pressure at which this second distillation occurs, is substantially inactive in a chemical sense with regard to the substance through which it passes, the reason for this being that it is highly desirable to avoid oxidation at this stage of the process.

The distillates of this second distillation are then cooled and then condensed to remove the solid product, naphthalene, by crystallization and the remaining light oils (hydro-carbon oils) may be subsequently reintroduced into the residue.

The residue of the second distillation will be found to consist mainly of the heavier hydro-carbon oils which are then oxidized or polymerized to attain the desired viscosity requisite of an agglutinant for the purpose set forth. The oxidization is carried on while the residue is in a comparatively thick layer and is effected by subjecting the same to the action of gaseous oxidizing agents such as air or oxygen which are allowed to bubble slowly up through the residue under pressure, and while the residue is heated to a minimum temperature of say 250° C. The thickening of the residue is produced by the polymerization caused by the oxidizing agents and this is continued until the residue has reached a viscosity which substantially corresponds to 11 of Engler's apparatus at 80° C. The resulting polymerized mass forms the product.

Considering the treatment of petroleum tars or petroleum residue, substantially the same steps are carried on as in the case of the treatment of coal tars above set forth, that is to say the petroleum residues are first heated to remove the highly volatile oils; on having removed these constituents the residue is subjected to a further distillation at a temperature above 120° C. and not exceeding 370° C. This distillation is carried on while the residue is reduced to a layer of moderate thickness and, during the distillation, the residue is continuously agitated by the passage of a current of gas therethrough under a reduced pressure, some gas being used which, at the temperature and pressure at which the second distillation occurs, is substantially inactive in a chemical sense with regard to the substance through which it passes, the reason for this being, as in the case of the coal tar process, that it is highly desirable to avoid oxidation at this stage of the process.

A supplementary distillation of the residue is then carried on at a temperature which may attain 370° C. as a maximum and the resulting product consist mainly of the heavy hydro-carbon oils which are then oxidized to produce the viscosity requisite of an agglutinant for the purpose set forth. This oxidization is carried on while the residue is in a comparatively thick layer and is effected by subjecting the same to the action of gaseous oxidizing agents which are permitted to bubble slowly up through the residue while under pressure, and while the residue is at a temperature not in excess of 370° C. The thickening or increase in viscosity produced by the polymerization resulting from the action of the oxidizing agents is continued until the residue has reached a viscosity which substantially corresponds to 11 of Engler's apparatus at 80° C. The resulting polymerized mass is the agglutinant product formed by petroleum residues.

It will be seen from the foregoing, that it is possible to produce an agglutinant by successively carrying on fractional distillation of either coal tar or petroleum residues and then producing polymerization by the introduction of an oxidizing agent which results in the formation of agglutinants having new properties which are particularly desirable for the manufacture of those coatings used in iron work.

I claim:—

1. The process of manufacturing an agglutinant from hydrocarbon oils, which consists in heating the oils to distil off some of the light hydrocarbon oils and ammonia, then subjecting the mass being distilled to a further distillation at a higher temperature in the presence of an agitating current of gas or vapors to remove the naphthalene and other light oils, then reintroducing some of the distillate oils from the second distillate into the mass being distilled, and then polymerizing and oxidizing the resultant mass to the desired viscosity by causing an oxidizing agent to bubble up through the mass.

2. The process of manufacturing an agglutinant from hydrocarbon oils, which consists in heating the oils to distil off some of the light hydrocarbon oils and ammonia, then subjecting the mass being distilled to a further distillation at a higher temperature in the presence of an agitating current of gas or vapors to remove the naphthalene and other light oils, then reintroducing some of the distillate oils from the second distillate into the mass being distilled and redistilling and reintroducing until a heavy oil is obtained, and then polymerizing the resultant mass to the desired viscosity by causing an oxidizing agent to bubble up through the mass.

In testimony whereof I affix my signature in presence of two witnesses.

JEAN ROSEN.

Witnesses:
 ELY E. PALMER,
 JOHN BAKER.